(12) United States Patent
Wang et al.

(10) Patent No.: US 10,323,631 B2
(45) Date of Patent: Jun. 18, 2019

(54) ELECTRIC PUMP

(71) Applicant: SHINANO KENSHI KABUSHIKI KAISHA, Nagano (JP)

(72) Inventors: Donghui Wang, Nagano (JP); Hiroaki Usui, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 0 days.

(21) Appl. No.: 15/324,990

(22) PCT Filed: Apr. 8, 2016

(86) PCT No.: PCT/JP2016/061482
§ 371 (c)(1),
(2) Date: Jan. 9, 2017

(87) PCT Pub. No.: WO2016/185825
PCT Pub. Date: Nov. 24, 2016

(65) Prior Publication Data
US 2018/0106244 A1 Apr. 19, 2018

(30) Foreign Application Priority Data

May 18, 2015 (JP) .................................. 2015-101054

(51) Int. Cl.
F04B 43/04 (2006.01)
F04B 9/04 (2006.01)
(Continued)

(52) U.S. Cl.
CPC ................ F04B 43/04 (2013.01); F04B 9/04 (2013.01); F04B 9/045 (2013.01); F04B 17/03 (2013.01);
(Continued)

(58) Field of Classification Search
CPC .......... F04B 17/03; F04B 35/04; F04B 43/04; F04B 45/04; F04B 45/047
See application file for complete search history.

(56) References Cited

U.S. PATENT DOCUMENTS 5,690,017 A * 11/1997 Riedlinger .......... F04B 39/0094
417/413.1
7,117,781 B2 * 10/2006 Lynn ................... F04B 39/0022
92/140

(Continued)

FOREIGN PATENT DOCUMENTS

JP 2000297744 10/2000
JP 2003214104 7/2003

OTHER PUBLICATIONS

International Search Report for PCT/JP2016/061482, dated Jul. 5, 2016.

(Continued)

Primary Examiner — Patrick Hamo
(74) Attorney, Agent, or Firm — Stephen J. Weyer, Esq.; Stites & Harbison, PLLC

(57) ABSTRACT

An electric pump includes a rotor (6) formed in a cup shape integrally assembled to a rotor shaft (10) extended from a motor (3) side to a crank mechanism side inside a case body (2) in a state where an opening is directed to a shaft end on the motor side and rotatably supported by an intermediate bearing (13) arranged inside the opening, an eccentric cam (6d) integrally provided with a top surface portion of the rotor (6) in the axial direction, which is eccentric to a shaft center of the rotor shaft (10), and a crank shaft (12) one end side of which is assembled to an outer periphery of the eccentric cam (6d) through a cam bearing (11) and the other end side of which is connected to the pump side, in which a distance between the intermediate bearing (13) and the eccentric cam (6d) to which the crank shaft (12) is connected (Continued)

is reduced as short as possible, thereby suppressing occurrence of vibration and noise as well as reducing the device size in the axial direction by shortening a shaft length of the rotor shaft (10).

8 Claims, 4 Drawing Sheets

(51) Int. Cl.
    *F04B 43/02*     (2006.01)
    *F04B 53/00*     (2006.01)
    *H02K 7/075*     (2006.01)
    *H02K 7/14*     (2006.01)
    *F04B 17/03*     (2006.01)
    *H02K 7/08*     (2006.01)
    *F04B 45/047*     (2006.01)
    *H02K 7/04*     (2006.01)
    *F04B 35/04*     (2006.01)
    *F04B 39/00*     (2006.01)
    *F04B 53/22*     (2006.01)

(52) U.S. Cl.
    CPC ............ *F04B 43/02* (2013.01); *F04B 53/001* (2013.01); *H02K 7/075* (2013.01); *H02K 7/083* (2013.01); *H02K 7/14* (2013.01); *F04B 35/04* (2013.01); *F04B 39/0044* (2013.01); *F04B 45/047* (2013.01); *F04B 53/22* (2013.01); *H02K 7/04* (2013.01)

(56) References Cited

U.S. PATENT DOCUMENTS

| | | | | |
|---|---|---|---|---|
| 8,999,593 | B2* | 4/2015 | Kato | ................. H01M 8/04097 |
| | | | | 417/189 |
| 2009/0130532 | A1* | 5/2009 | Yokozawa | ............ B01F 5/0685 |
| | | | | 429/409 |
| 2009/0148321 | A1* | 6/2009 | Muramatsu | ........... F04B 17/042 |
| | | | | 417/502 |
| 2010/0202893 | A1 | 8/2010 | Bacher et al. | |
| 2014/0017094 | A1* | 1/2014 | Ghodsi-Kameneh | ......................... F01C 21/08 |
| | | | | 417/44.1 |

OTHER PUBLICATIONS

Written Opinion of the International Searching Authority for PCT/JP2016/061482, dated Jul. 5, 2016.

* cited by examiner

ELECTRIC PUMP

TECHNICAL FIELD

The present invention relates to an electric pump which drives a pump by a motor used for, for example, OA equipment, home electric appliances, industrial equipment, medical equipment and so on.

BACKGROUND ART

The following technique in which a diaphragm facing a pump chamber (diaphragm pump) is used as an electric pump which drives the pump by converting the drive of the motor into a reciprocating motion of connecting rods by a crank mechanism is proposed.

A motor includes a rotor and a stator in a motor casing, a rotor shaft extended from the motor casing to a pump-body side and a motor driving circuit substrate. One ends of a pair of connecting rods are respectively assembled to the rotor shaft extended to the pump-body side through a pair of bearings. The pair of connecting rods are respectively assembled to positions where phases are shifted by 180 degrees. The other ends of the pair of connecting rods are respectively coupled to diaphragms through retainers. The diaphragm, a valve seat and a pump head portion are assembled to the pump body. A cylindrical eccentric shaft for cancelling the eccentricity of the pair of connecting rods is assembled to the vicinity of a shaft end of the rotor shaft extended on the pump-body side, and the connecting rods are assembled to the eccentric shaft through the bearings.

When the motor in the motor casing is rotated, the eccentric shaft attached to the rotor shaft extended on the pump body is also rotated, thereby reciprocating the connecting rods. At this time, the diaphragm is deformed and fluid in a pump chamber is discharged and sucked through a valve and a fluid passage (refer to Patent Literature 1).

CITATION LIST

Patent Literature

PTL 1: JP-A 2000-297744

SUMMARY OF INVENTION

Technical Problem

The electric pump disclosed in Patent Literature 1 is an outer-rotor type motor in which the rotor of the motor is formed in a cup shape, which is assembled so that a top surface portion of a rotor yoke is directed to the shaft end, in which both ends of the rotor shaft are rotatably supported by a pair of bearings provided in the motor casing on both sides of the rotor yoke in the axial direction. As the motor driving circuit substrate and a stator housing are assembled in an overlapping manner at an interface between the motor casing and the pump body, the shaft length of the rotor shaft becomes long and a distance from the bearing (fulcrum) on the motor side to the connecting rod (point of action) becomes long, therefore, the device is increased in size and the rotor shaft tends to vibrate, which will be a factor of noise.

Additionally, the connecting rods are assembled to the eccentric shaft through the bearings after the cylindrical eccentric shaft is assembled to the rotor shaft extended on the pump body side, therefore, backlash or vibration tends to occur due to shaft misalignment between many assembling parts such as the rotation shaft, the eccentric shaft, the bearings and the connecting rods.

When rotational stability of the motor is considered, it is not realistic to reduce the size of the bearing provided on the motor side as rotational stability of the rotor may be reduced.

Solution to the Problem

The present invention has been accomplished under the circumstances in view. It is an object thereof to provide an electric pump capable of reducing the device size in the axial direction with low vibration and low noise as well as with high rotational stability.

The present invention has the following structure in order to achieve the above object.

An electric pump in which a motor and a crank mechanism driven by the motor are integrally assembled inside a case body adjacent to a pump, which includes a rotor formed in a cup shape integrally assembled to a rotor shaft extended from the motor side to the crank mechanism side inside the case body in a state where an opening is directed to a shaft end on the motor side and rotatably supported by an intermediate bearing arranged inside the opening, an eccentric cam integrally provided with a top surface portion of the rotor, which is eccentric to a shaft center of the rotor shaft and a crank shaft one end side of which is assembled to the eccentric cam through a cam bearing and the other end side of which is connected to the pump side, in which the motor is driven to be rotated, thereby converting a rotary motion of the eccentric cam around the rotor shaft into a reciprocating motion of the crank shaft and driving the pump.

According to the above structure, the rotor is integrally assembled to the rotor shaft in the state where the opening of the rotor formed in a cup shape is directed to the shaft end on the motor side, therefore, the intermediate bearing can be arranged closely to the top surface portion of the rotor by using a free space inside the opening of the rotor. Additionally, as the top surface portion of the rotor and the eccentric cam are integrally provided, the distance from the intermediate bearing to the eccentric cam to which the crank shaft is connected can be reduced as short as possible, thereby suppressing occurrence of vibration and noise as well as reducing the device size in the axial direction by shortening the shaft length of the rotor shaft. Furthermore, the intermediate bearing having a relatively larger diameter is used in an opening of a rotor yoke, thereby improving the rotational stability of the rotor.

As the rotor yoke and the eccentric cam are integrally assembled, an inertia moment of the rotor is increased and the thrust for reciprocating the crank shaft can be improved.

It is preferable that the eccentric cam is integrally provided with a balance weight portion for cancelling the eccentricity of the crank shaft assembled through the cam bearing. In this case, the rotor yoke, the eccentric cam and the balance weight portion are integrally formed, therefore, shaft alignment between components are performed and the eccentricity is cancelled, thereby reducing vibration, the number of components and assembly man hours to improve assembling property.

It is preferable that a shaft end of the rotor shaft of the motor extended from the eccentric cam to the crank mechanism side is rotatably supported by a crank side bearing assembled to the case body.

According to the above structure, the shaft end of the rotor shaft on the crank-mechanism side on which an external force acts is rotatably supported by the crank-side bearing assembled to the case body, thereby suppressing the runout of the rotor shaft.

In particular, when the crank side bearing is assembled to the case body through an elastic body, the amount of shaft misalignment between the rotor shaft and the crank-side bearing can be absorbed by deformation of the elastic body as well as vibration at the shaft end of the rotor shaft can be reduced.

When the intermediate bearing is assembled inside the opening of the rotor closely to the top surface portion of the rotor, the distance between the crank shaft connecting to the eccentric cam and the intermediate bearing can be reduced as short as possible, therefore, vibration of the crank shaft reciprocating by the rotatory drive of the motor is suppressed and occurrence of noise is also suppressed.

The intermediate bearing may be formed by plural bearings assembled closely in the axial direction. According to the structure, the rotational stability of the rotor is improved even when small bearings are used.

It is preferable that the rotor is formed so that a rotor hub assembled to block an end surface of the rotor yoke formed in a cylindrical shape is integrally assembled to the rotor shaft, and that the rotor is rotatably supported through the intermediate bearing assembled between the rotor hub and a stator housing.

According to the above structure, the rotor yoke and the rotor hub which form the rotor can be separately manufactured, thereby easily forming the rotor hub and the eccentric cam integrally with shaft alignment. The assembly between the rotor and the rotor yoke as well as the assembly between the rotor hub and the eccentric cam can be easily performed. Furthermore, the rotor is rotatably supported through the intermediate bearing assembled between the stator housing and the rotor hub, therefore, the intermediate bearing provided in the opening of the rotor can be arranged as closely as possible to the eccentric cam, which can reduce the distance between a fulcrum and a point of action and can improve the rotational stability of the rotor.

The electric pump may be a diaphragm pump in which the other end of the crank shaft is coupled to a diaphragm facing a pump chamber. Accordingly, a small-sized electric diaphragm pump with less vibration can be provided.

Advantageous Effects of Invention

According to the above electric pump, it is possible to provide an electric pump capable of reducing the device size in the axial direction with low vibration, low noise and high rotational stability.

DESCRIPTION OF EMBODIMENTS

Figure 1:
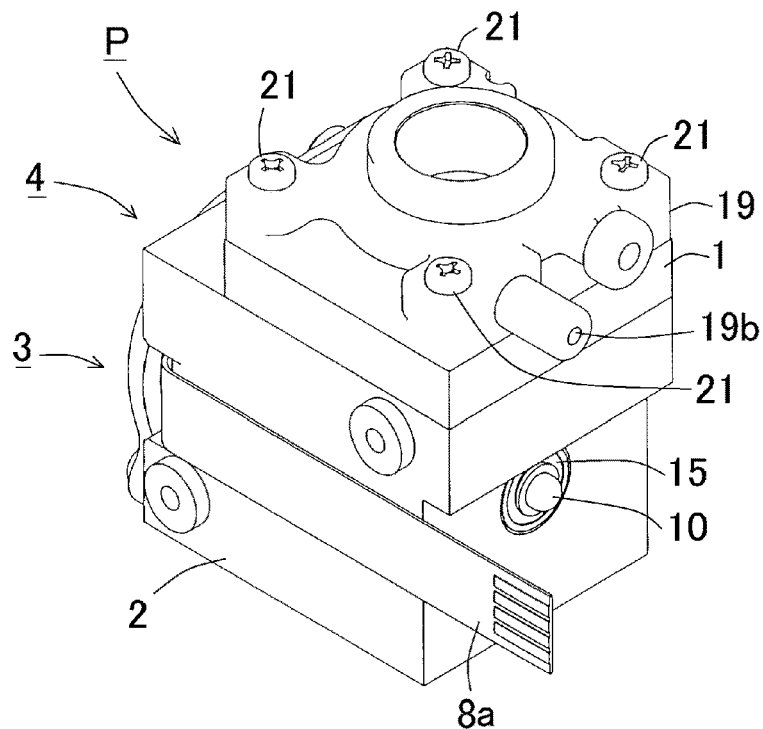
FIG. 1 is a perspective view of an electric pump.

Hereinafter, an electric pump according to an embodiment of the present invention will be explained with reference to the attached drawings. As shown in FIG. 1, an electric pump P has a motor and a crank mechanism driven by the motor are integrally assembled inside a case body 2 which is adjacent to a pump case 1. An outer-rotor type DC brushless motor 3 is used as an example of the motor, and a diaphragm pump 4 is used as an example of the pump. Other pumps such as a piston pump provided with a cylinder and a piston in the case body 2 may be adopted instead of using the diaphragm pump 4.

Figure 2:
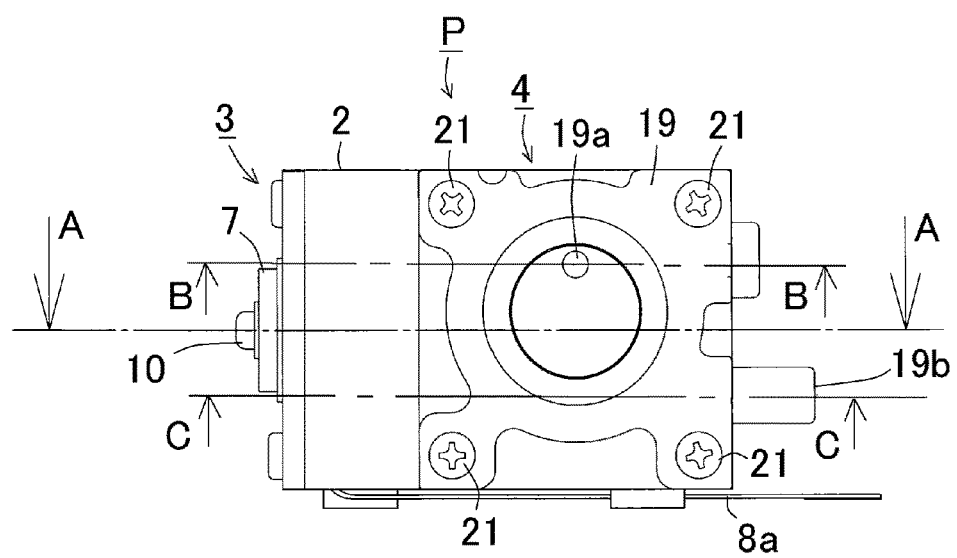
FIG. 2 is a plan view of the electric pump.

First, the structure of the outer-rotor type DC brushless motor 3 will be explained with reference to FIG. 3. The outer-rotor type DC brushless motor 3 includes a stator 5 and a rotor 6. In the stator 5, a motor substrate 8 and a stator core 9 are respectively assembled to a cylindrical stator housing 7 which is fixed to the case body 2. The motor substrate 8 is assembled so as to overlap a flange portion 7a formed in the stator housing 7. The motor substrate 8 is provided with a sensor substrate on which hall devices and so on are mounted, power feeding terminals to a motor coil and so on. A flexible cable 8a connecting to the motor substrate 8 is drawn out from the case body 2 (see FIG. 1, FIG. 2). The not-shown motor coil is wound around pole teeth 9a which are radially formed in the stator core 9.

The rotor 6 is formed in a cup shape one end in the axial direction of which opens. Specifically, a rotor shaft 10 is integrally assembled to a rotor hub 6b which is assembled to block one end surface of a rotor yoke 6a formed in a cylindrical shape. That is, the rotor 6 is integrally assembled so that an opening of the rotor yoke 6a is directed to a shaft end on the motor side and the rotor shaft 10 is pressed into the rotor hub 6b provided on a top surface portion. An annular magnet 6c is provided on an inner peripheral surface of the rotor yoke 6a. The magnet 6c is assembled at a position facing the pole teeth 9a of the stator core 9. An eccentric cam 6d is integrally formed in the rotor hub 6b. A balance weight 6e (counter weight) is further formed in the eccentric cam 6d. This is provided for cancelling the eccentricity of a crank shaft 12 one end of which is assembled to the eccentric cam 6d through a cam bearing 11.

The rotor 6 may use the rotor yoke 6a integrally molded in a cup shape by drawing a metal magnetic substance (for example, a galvanized steel sheet), and the eccentric cam 6d may be integrally assembled to a top surface portion of the rotor yoke 6a.

An intermediate bearing 13 is assembled between the stator housing 7 and the rotor hub 6b. That is, the intermediate bearing 13 is provided inside the opening of the rotor 6 closely to the top surface portion (rotor hub 6b). The intermediate bearing 13 rotatably supports the rotor 6. Accordingly, a distance from the intermediate bearing 13 to the eccentric cam 6d to which the crank shaft 12 is connected can be reduced as short as possible, thereby suppressing occurrence of vibration and noise as well as reducing the device size in the axial direction by shortening the shaft length of the rotor shaft 10. Furthermore, as the intermediate bearing 13 is provided inside the opening of the rotor 6 (rotor hub 6b), the rotational stability of the rotor 6 is improved. As for the intermediate bearing 13, plural bearings may be assembled closely in the axial direction.

The rotor shaft 10 is rotatably supported by a motor-side bearing 14 one end of which is assembled to an end portion the stator housing 7. The motor-side bearing 14 is assembled to the stator housing 7 by being preloaded toward the outer side in the axial direction while falling-off is prevented by an E-ring and so on. The rotor shaft 10 is inserted through the stator housing 7, and the other end side is extended to the crank mechanism side of the case body 1. The other end of the rotor shaft 10 is rotatably supported by a crank-side bearing 15 assembled to the case body 1. The rotor shaft 10 is assembled to the case body 1 while falling-off is prevented by an E-ring and so on. The crank-side bearing 15 is assembled to the case body 1 through an elastic body 16 (an O-ring, an annular rubber and so on).

According to the above structure, the shaft end of the rotor shaft 10 on the crank-mechanism side on which an external force acts is rotatably supported by the crank-side bearing 15, thereby suppressing the runout of the rotor shaft 10. In particular, when the crank-side bearing 15 is assembled to the case body 1 through the elastic body 16, the amount of shaft misalignment between the rotor shaft 10 and the crank-side bearing 15 can be absorbed by deformation of the elastic body 16 as well as vibration at the shaft end of the rotor shaft 10 can be reduced.

The cam bearing 11 is assembled to an outer periphery of the eccentric cam 6d which is integrally assembled to the top surface portion (rotor hub 6b) of the rotor 6. One end of the crank shaft 12 is assembled through the cam bearing 11. The other end of the crank shaft 12 is coupled to a diaphragm 17 facing a pump chamber 18 on the diaphragm pump 4 side.

The diaphragm 17 is assembled in a state of being sandwiched between the case body 2 and the pump case 1 in which the pump chamber 18 is formed. A pump head 19 is integrally assembled to the pump case 1 through a sealing material 20. The pump head 19 is fixed to the pump case 1 by bolts 21 at four corners. In the pump head 19, a suction port 19a and a discharge port 19b of fluid (gas, liquid and so on) are formed.

Figure 4:
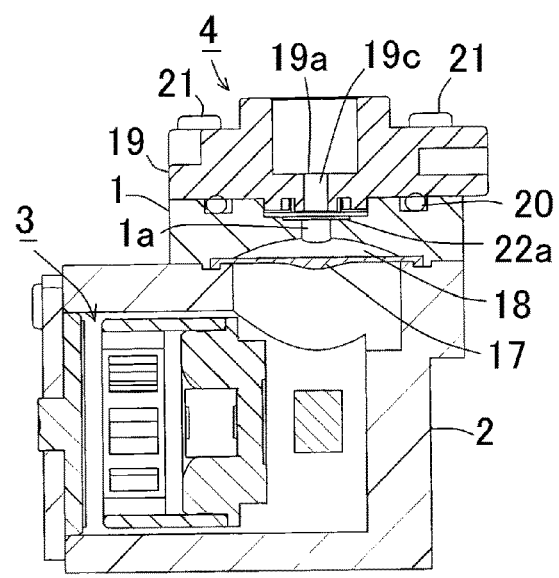
FIG. 4 is a cross-sectional view taken along arrows B-B in the electric pump of FIG. 2.

As shown in FIG. 4, a suction passage 19c communicating with the suction port 19a is formed in the pump head 19. A suction port 1a communicating with the suction passage 19c is formed in the pump case 1. The suction passage 1a communicates with the pump chamber 18. A suction-side check valve 22a is provided at an interface between the pump head 19 and the pump case 1. The suction-side check valve 22a is provided at a position where the suction passage 19a and the suction passage 1a which communicates with the suction passage 19a are partitioned. The suction-side check valve 22a opens when a fluid pressure inside the pump chamber 18 is negative, and closes when the fluid pressure is balanced or positive.

Figure 5:
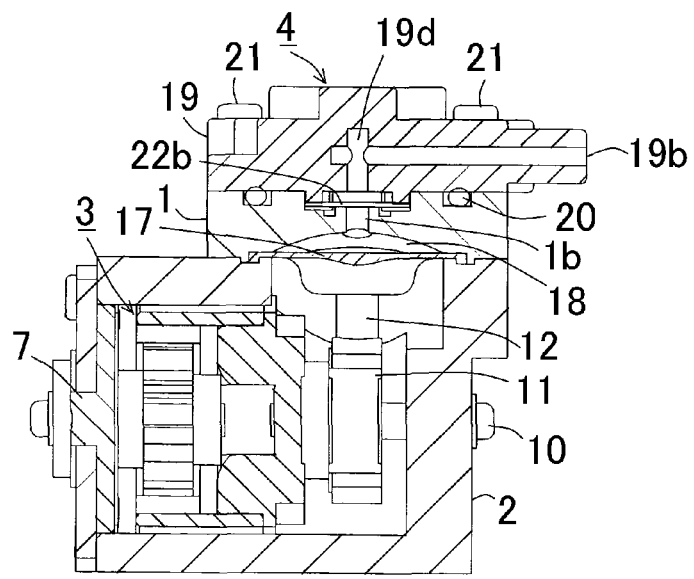
FIG. 5 is a cross-sectional view taken along arrows C-C in the electric pump of FIG. 2.

As shown in FIG. 5, a discharge passage 19d communicating with the discharge port 19b is formed in the pump head 19. In the pump case 1, a discharge passage 1b communicating with the discharge passage 19d is formed. The discharge passage 1b communicates with the pump chamber 18. A discharge-side check valve 22b is provided at an interface between the pump head 19 and the pump case 1. The discharge-side check valve 22b is provided at a position where the discharge passage 19b and the discharge passage 1b communicating with the discharge passage 19b are partitioned. The discharge-side check valve 22b opens when the fluid pressure inside the pump chamber 18 is positive and closed when the fluid pressure is balanced or negative.

Figure 3:
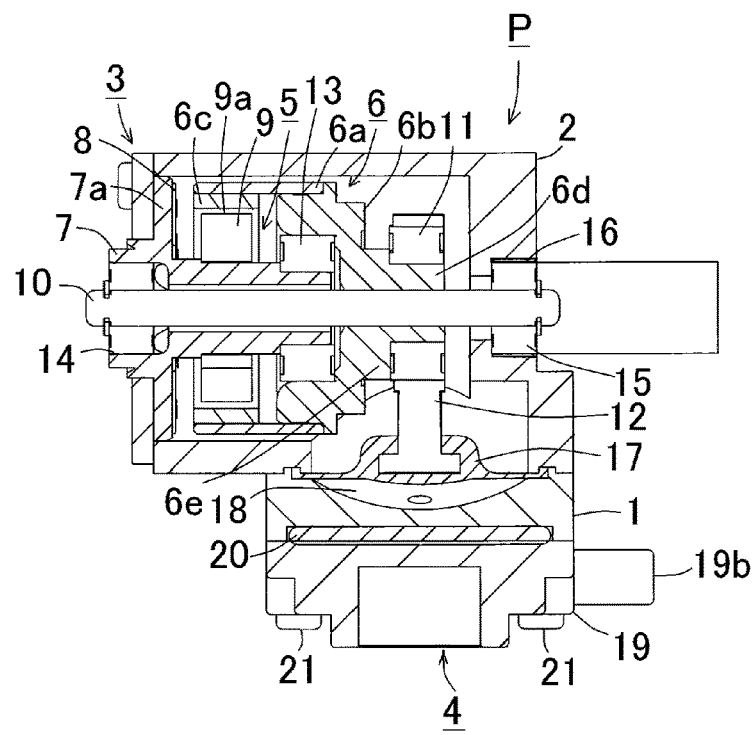
FIG. 3 is a cross-sectional view taken along arrows A-A in the electric pump of FIG. 2.

In FIG. 3, the motor (the outer-rotor type DC brushless motor 3) is driven to be rotated, thereby converting the rotary motion of the eccentric cam 6d around the rotary shaft 10 into the reciprocating motion of the crank shaft 12 and deforming the diaphragm 17 to repeat operations of discharging the fluid inside the pump chamber 18 from the discharge port 19b and sucking the fluid from the suction port 19a.

As described above, the rotor 6 formed in the cup shape is integrally assembled to the rotor shaft 10 with the opening being directed toward the shaft end of the motor side, therefore, the intermediate bearing 13 can be arranged closely to the top surface portion of the rotor 6 by using a free space inside the opening of the rotor 6. Moreover, as the top surface portion of the rotor 6 and the eccentric cam 6d are integrally formed, the distance from the intermediate bearing 13 to the eccentric cam 6d to which the crank shaft 12 is connected can be reduced as short as possible, thereby suppressing occurrence of vibration and noise as well as reducing the device size in the axial direction by shortening the shaft length of the rotor shaft 10. Furthermore, the intermediate bearing 13 having a relatively large diameter is used in the opening of the rotor 6, the rotational stability of the rotor 6 is improved.

As the rotor 6 and the eccentric cam 6d are integrally assembled, an inertia moment of the rotor 6 is increased and the thrust for reciprocating the crank shaft 12 can be improved.

As the rotor 6, the eccentric cam 6d and the balance weight 6e are integrally provided, shaft alignment between components is made and the eccentricity is cancelled, thereby reducing the number of components and reducing assembly man hours as well as reducing vibration and improving the rotational stability of the rotor 6.

The shaft end of the rotor shaft 10 on the crank-mechanism side on which the external force acts is rotatably supported by the crank-side bearing 15, thereby suppressing the runout of the rotor shaft 10. In particular, when the crank-side bearing 15 is assembled to the case body 1 through the elastic body 16, the amount of shaft misalignment between the rotor shaft 10 and the crank-side bearing 15 can be absorbed by deformation of the elastic body 16 as well as vibration at the shaft end of the rotor shaft 10 can be reduced.

When the intermediate bearing 13 is assembled in the opening of the rotor 6 closely to the top surface portion of the rotor 6, the distance from the crank shaft 12 connecting to the eccentric cam 6d to the intermediate bearing 13 can be reduced as short as possible, therefore, vibration of the crank shaft 12 reciprocating by the rotary drive of the motor is suppressed and the occurrence of noise can be also suppressed.

The case where the crank shaft 12 is connected to the rotor shaft 10 at one place (the pump chamber 18 exists at one place) in the electric pump P has been explained, however, it is also preferable that the crank shaft 12 is connected to the rotor shaft 10 at plural places and plural pump chambers 18 are provided.

For example, it is also preferable that a pair of crank shafts 12 are respectively provided in the rotor shaft 10 at positions phases of which are displaced by 180 degrees through cam bearings 11 and that a pair of balance weights 6e are respectively provided in the eccentric cam 6d at positions phases of which are displaced by 180 degrees with respect to the crank shafts 12, thereby achieving counterbalance.

Figure 6:
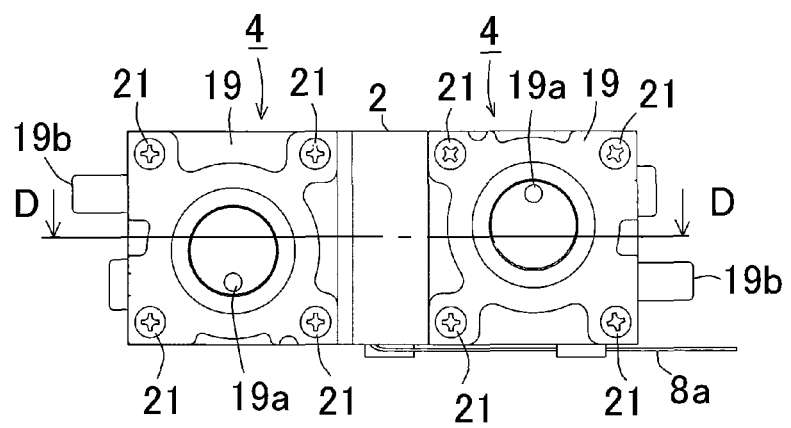
FIG. 6 is a plan view showing an application example of an electric pump according to another embodiment.
Figure 7:
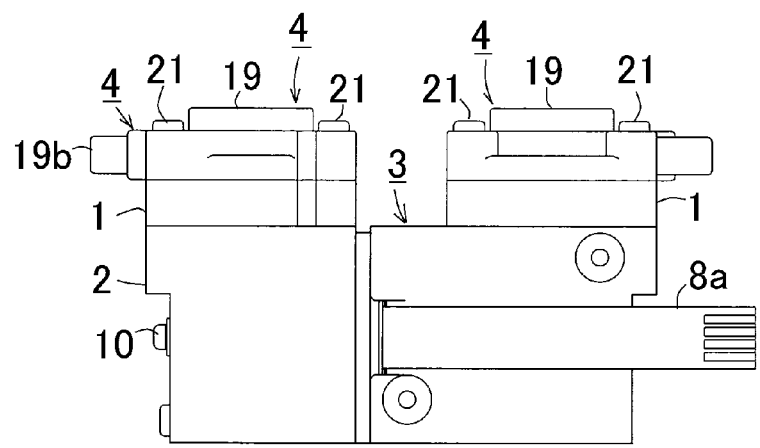
FIG. 7 is a front view of the electric pump of FIG. 6.
Figure 8:
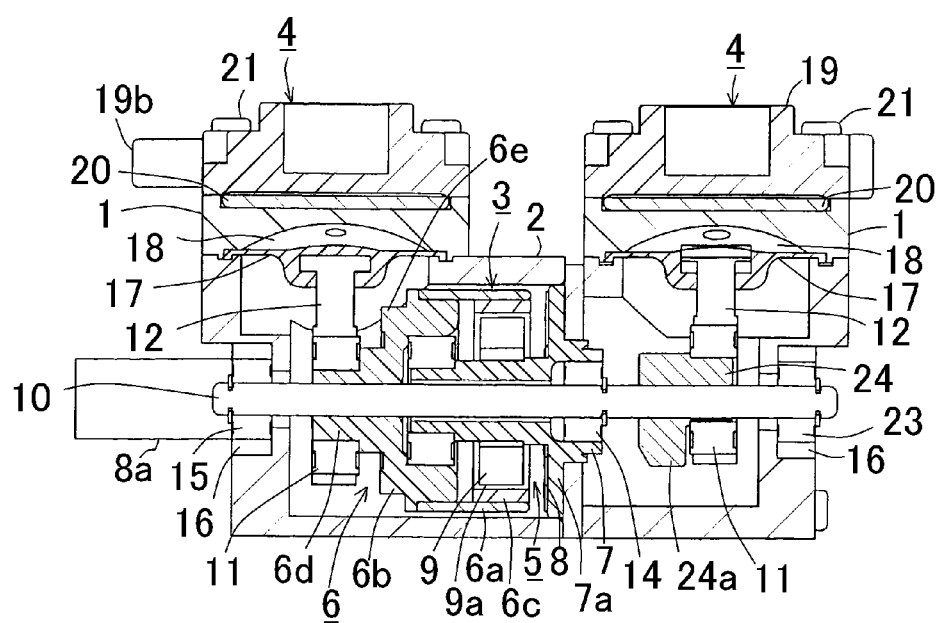
FIG. 8 is a cross-sectional view taken along arrows D-D of FIG. 6.

An application example of the electric pump P will be shown in FIG. 6 to FIG. 8.

As the application example of the electric pump P, the crank mechanisms may be provided on both sides of the motor and plural diaphragm pumps 4 may be provided. As shown in FIG. 6 and FIG. 7, the pump cases 1 and the pump heads 19 are provided in the casing 2 at two places. As shown in FIG. 6, the suction ports 19a and the discharge ports 19b are provided at positions inverted by 180 degrees in the right and left pair of diaphragm pumps 4.

In FIG. 8, a basic structure (the left side of FIG. 8) of the electric pump (the outer-rotor type DC brushless motor 3 and the diaphragm pump 4) is similar to that of FIG. 3, therefore, a different structure (an expanded portion on the right side of FIG. 8) will be mainly explained. The same numerals are given to the same members as those of FIG. 3 and explanation will be invoked. The rotor shaft 10 is extended by the motor-side bearing 14 of the outer-rotor type DC brushless motor 3 and the shaft end thereof is rotatably supported by an expansion-side bearing 23 of the case body 1. The rotor shaft 10 is assembled to the case body 1 while falling-off is prevented by an E-ring and so on. The expansion-side bearing 23 is preferably assembled to the case body 1 through the elastic body 16 (the O-ring, the annular rubber and so on).

An expansion-side eccentric cam 24 is integrally assembled to the rotor shaft 10 extended to the motor side. A balance weight 24a (counter weight) is integrally formed in the expansion-side eccentric cam 24. This is provided for cancelling the eccentricity of the expansion-side crank shaft 12 on end side of which is assembled to the expansion-side eccentric cam 24 through the cam bearing 11. It is preferable that the expansion-side eccentric cam 24 is arranged as closely as possible to the motor-side bearing 14.

According to the above structure, the rotation of the rotor 6 of the same DC brushless motor 3 can be converted into the reciprocating motion of the two crank shaft 12 connecting to the rotor shaft 10 to thereby drive two diaphragm pumps 4 at the same time.

A pair (two cylinders) of piston pumps or two pairs (four cylinders) of piston pumps in which cylinders and pistons are provided in the case body 2 may be provided instead of the diaphragm pumps 4.

The above electric pump P is used to a wide range of apparatuses such as OA equipment, home electric appliances, industrial equipment, medical equipment and so on.

What is claimed is:

1. An electric pump in which a motor and a crank mechanism driven by the motor are integrally assembled inside a case body adjacent to a pump, comprising:
   a rotor shaft provided in the case body and extended toward the crank mechanism side from the motor side;
   a rotor formed in a cup shape by closing one end of a cylindrical rotor yoke with a rotor hub, the rotor being integrally assembled to the rotor shaft with the rotor hub in a state where an opening of the rotor yoke is opened in a direction opposite to the pump side;
   an intermediate bearing arranged inside the opening and rotatably supporting the rotor which is capable of rotating about the rotor shaft;
   an eccentric cam integrally provided with the rotor hub of the rotor, the eccentric cam being eccentric to a shaft center of the rotor shaft; and
   a crank shaft one end side of which is assembled to the eccentric cam through a cam bearing and the other end side of which is connected to the pump side,
   wherein the motor is driven to be rotated, thereby converting a rotary motion of the eccentric cam around the rotor shaft into a reciprocating motion of the crank shaft and driving the pump.

2. The electric pump according to claim 1, wherein the eccentric cam is integrally provided with a balance weight for cancelling the eccentricity of the crank shaft assembled through the cam bearing with respect to the shaft center of the rotor shaft.

3. The electric pump according to claim 1, wherein a shaft end of the rotor shaft of the motor extended from the eccentric cam to the crank mechanism side is rotatably supported by a crank side bearing assembled to the case body.

4. The electric pump according to claim 3, wherein the crank side bearing is assembled to the case body through an elastic body.

5. The electric pump according to claim 1, wherein the intermediate bearing is assembled inside the opening of the rotor closely to the rotor hub of the rotor.

6. The electric pump according to claim 5, wherein the intermediate bearing is formed by plural bearings assembled closely in the axial direction.

7. The electric pump according to claim 1, wherein the rotor is formed so that a rotor hub assembled to block an end surface of a rotor yoke formed in a cylindrical shape is integrally assembled to the rotor shaft, and
the rotor is rotatably supported through the intermediate bearing assembled between the rotor hub and a stator housing.

8. The electric pump according to claim 1, wherein the electric pump is a diaphragm pump in which the other end of the crank shaft is coupled to a diaphragm facing a pump chamber.

* * * * *